(12) United States Patent
Kim et al.

(10) Patent No.: US 12,536,650 B2
(45) Date of Patent: Jan. 27, 2026

(54) METHOD OF SETTING SCAN REGION

(71) Applicant: MEDIT CORP., Seoul (KR)

(72) Inventors: Jin Young Kim, Seoul (KR); Jin Su Kim, Seoul (KR)

(73) Assignee: MEDIT CORP., Seoul (KR)

( * ) Notice: Subject to any disclaimer, the term of this patent is extended or adjusted under 35 U.S.C. 154(b) by 466 days.

(21) Appl. No.: 17/851,063

(22) Filed: Jun. 28, 2022

(65) Prior Publication Data

US 2022/0414876 A1    Dec. 29, 2022

(30) Foreign Application Priority Data

Jun. 29, 2021   (KR) .......................... 10-2021-0085086
Apr. 15, 2022   (KR) .......................... 10-2022-0047114

(51) Int. Cl.
  *G06T 7/12*       (2017.01)
  *G06T 7/00*       (2017.01)
  *G06T 7/70*       (2017.01)
  *G06V 10/12*      (2022.01)
  *G06V 10/25*      (2022.01)

(52) U.S. Cl.
  CPC .............. *G06T 7/0012* (2013.01); *G06T 7/70* (2017.01); *G06V 10/12* (2022.01); *G06V 10/25* (2022.01); *G06T 2207/10016* (2013.01); *G06T 2207/30036* (2013.01)

(58) Field of Classification Search
  CPC ..................... G06T 7/0012; G06T 7/70; G06T 2207/10016; G06T 2207/30036; G06V 10/12; G06V 10/25
  See application file for complete search history.

(56) References Cited

U.S. PATENT DOCUMENTS

| | | | |
|---|---|---|---|
| 9,392,263 B2* | 7/2016 | Imai | G06F 3/04883 |
| 2006/0228010 A1 | 10/2006 | Rubbert et al. | |
| 2020/0086656 A1* | 3/2020 | Nakamura | B41J 3/36 |
| 2021/0112229 A1* | 4/2021 | Page | H04N 23/667 |

FOREIGN PATENT DOCUMENTS

| | | |
|---|---|---|
| KR | 10-1530631 B1 | 6/2015 |
| KR | 10-1802918 B1 | 12/2017 |
| KR | 10-2018-0106016 A | 10/2018 |
| WO | 2020/223594 A2 | 11/2020 |

OTHER PUBLICATIONS

Extended European Search Report mailed Nov. 30, 2022 for European Application No. 22181269.6.
Non-final Office Action mailed on Jan. 12, 2024 from the Korean Patent Office for Korean Application No. 10-2022-0047114.

* cited by examiner

*Primary Examiner* — Ming Y Hon
*Assistant Examiner* — Amanda H Pearson

(57) ABSTRACT

Provided is a method of setting a scan region, the method including: placing a target object on an upper surface of a jig of a three-dimensional scanner in such a manner that at least one portion of a target object image representing a shape of the target object is plotted on an input region; determining, by a control unit, a predetermined upper portion of the input region, as a scan region, from a jig image representing the shape of the jig; and generating, by the control unit, a three-dimensional model of the target object on the basis of the target object image resulting from scanning the scan region.

6 Claims, 12 Drawing Sheets

PRIOR ART

PRIOR ART

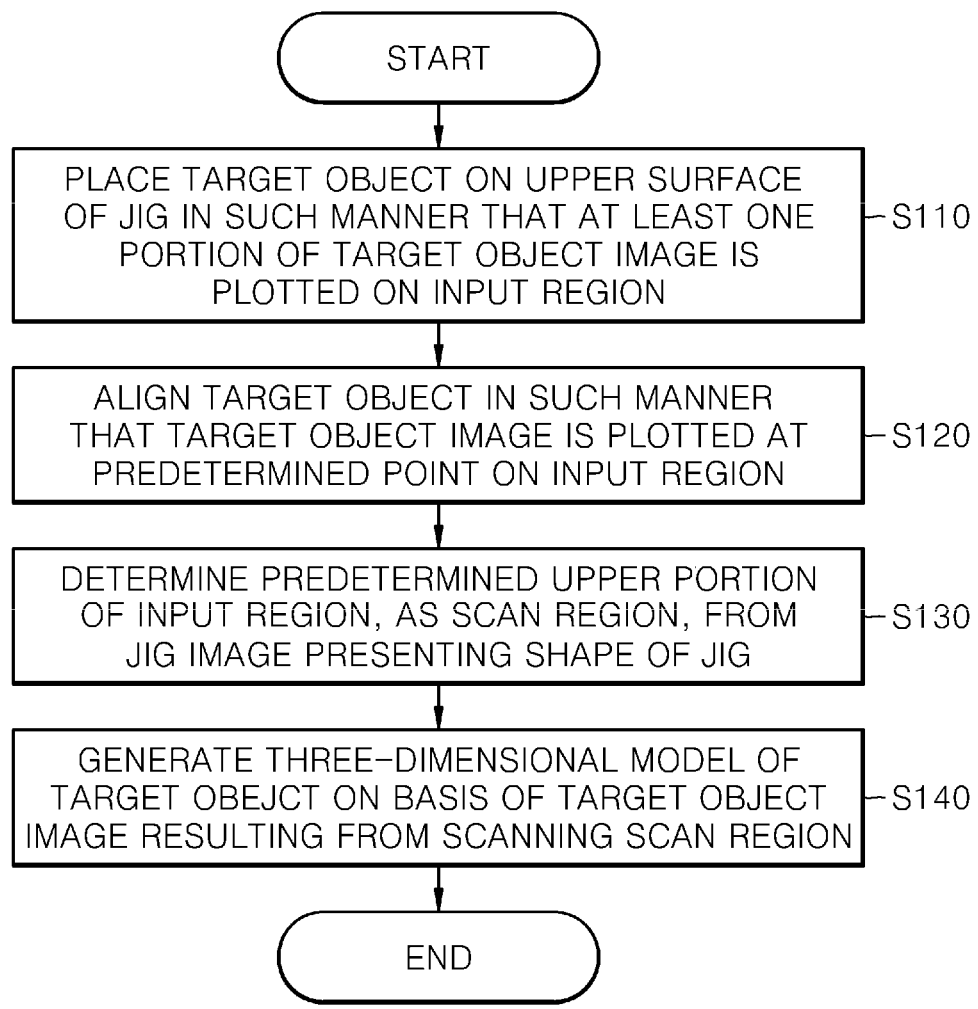

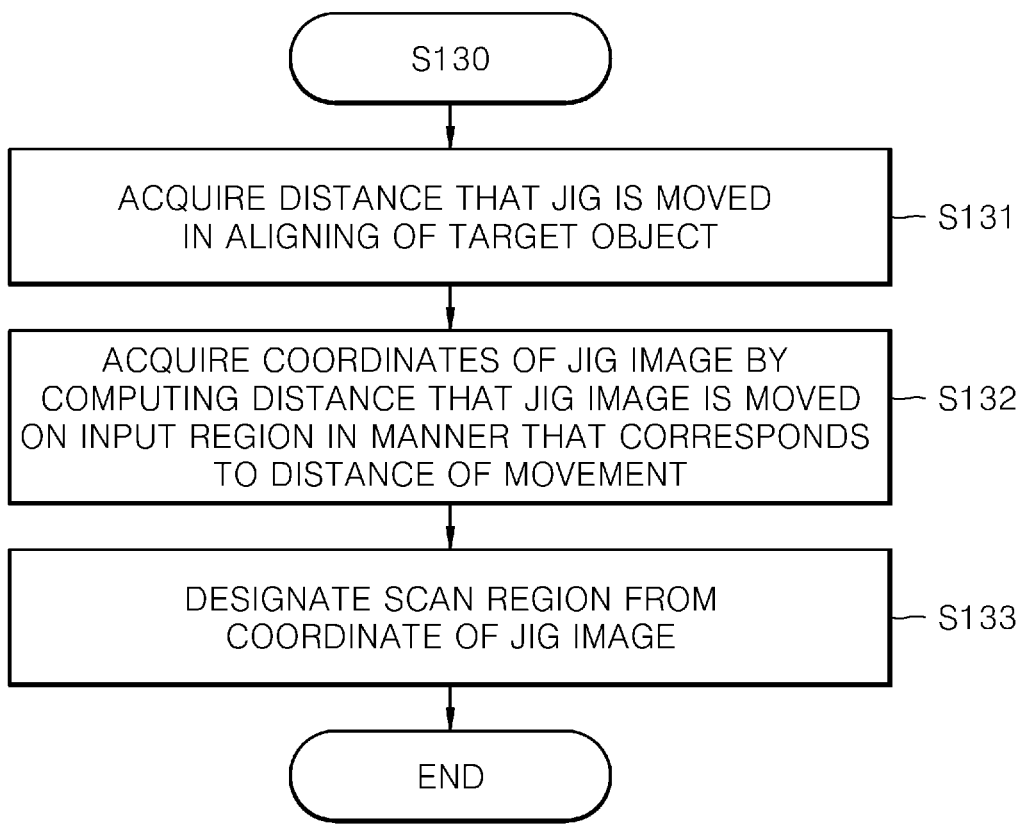

METHOD OF SETTING SCAN REGION

CROSS-REFERENCE TO RELATED APPLICATIONS

This application claims the benefit of and priority to Korean Patent Application Nos. 10-2021-0085086, filed on Jun. 29, 2021; and 10-2022-0047114, filed on Apr. 15, 2022, the disclosure of which are herein incorporated by reference in their entirety.

BACKGROUND

1. Technical Field

The present disclosure relates to a method of setting a scan region and, more particularly, to a method of setting a scan region, the method being capable of aligning a target object in such a manner that a target object image is plotted at a predetermined point on an input region and then of determining at least one portion of the input region, as the scan region.

2. Related Art

Three-dimensional scanning technologies have been used in various fields of industry, such as measurement, testing, reverse engineering, content generation, CAD/CAM for dental treatment, and medical equipment. With development in computing technology, an improvement in scanning performance has further increased the practical use of scanners. Particularly, the three-dimensional scanning technology is employed to provide dental treatment for a patient in the field of dental treatment, and thus, high precision is required of a three-dimensional model acquired through three-dimensional scanning.

A three-dimensional scanner 910, which scans a target object O (for example, a model that is cast from plaster of paris to duplicate a patient's oral cavity) using the three-dimensional scanning technology, may rotate the target object O (rotate the target object O in one direction (a clockwise or counterclockwise direction) while the target object O is horizontally maintained, in a stably seated state, with respect to one axis of the target object O) and/or tilt the target object O (tilt the target object O to a predetermined inclined angle) in such a manner as to possibly scan the target object O from various angles. As illustrated in FIG. 1, in the three-dimensional scanner 910, a jig 913 is rotated horizontally in one direction or tilted, with the target object O being placed on the top of the jig 913 (an arm). Thus, at least one target object image may be acquired, and a three-dimensional model may be generated on the basis of the one target object image.

In addition to the target object image acquired by scanning the target object O, a jig image representing the jig 913 on which the target object O is placed may also be acquired. Moreover, in addition to the target object image acquired by scanning the target object O, an adhesive-member image representing an adhesive member (for example, Blue-Tack reusable adhesive) for fixing the target object O to the jig 913 may also be acquired. The acquired jig image and/or adhesive-member image may be three-dimensionally modeled together with the target object image. However, the three-dimensionally modeling of the acquired jig image and/or adhesive-member image may prevent acquisition of a precise three-dimensional model of the target object O.

In the related art, a user has to manually delete the jig image and the adhesive-member image that are acquired together with the target object image. In the related art, as illustrated in FIG. 2, the user also has to arbitrarily set line Y' for adjusting a scan region 530 in order to remove a jig image 200 and an adhesive-member image 300, which are possibly acquired together with a target object image 100, from a three-dimensional modeling process. However, while the user arbitrarily adjusts the scan region 530, there may occur a problem in that the jig image 200 and the adhesive-member image 300 are not completely removed. Moreover, there may occur a problem in that at least one portion of the target object image 100 is inadvertently removed and thus that the incomplete three-dimensional model is acquired.

Therefore, in order to acquire the precise three-dimensional model representing the target object O, there is a need to provide a method of setting the precise scan region 530.

PRIOR ART DOCUMENT

Patent Document (Patent Document) Korean Patent No. 10-1530631 (registered on Jun. 23, 2015)

SUMMARY

An object of the present disclosure, which is made to solve the above-mentioned problems, is to provide a method of setting a scan region, the method being capable of automatically setting as a scan region an upper portion of a jig image representing a jig on which a target object is placed when a target object image representing the target object is plotted at a predetermined point on an input region.

The present disclosure is not limited to the above-mentioned object, and, from the following description, an object not mentioned above would be understandable to a person of ordinary skill in the art.

According to an aspect of the present disclosure, there is provided a method of setting a scan region, the method including: placing a target object on an upper surface of a jig of a three-dimensional scanner in such a manner that at least one portion of a target object image representing a shape of the target object is plotted on an input region; determining, by a control unit, a predetermined upper portion of the input region, as a scan region, from a jig image representing the shape of the jig; and generating, by the control unit, a three-dimensional model of the target object on the basis of the target object image resulting from scanning the scan region.

The method may further include a different step. Accordingly, the completeness level of the three-dimensional model representing the target object can be improved.

With the use of the method of setting a scan region according to the present disclosure, an upper end of a jig image is used in setting a scan region. Thus, there is provided an advantageous effect in that a user can acquire a precise three-dimensional model representing a target object.

In addition, in the method of setting a scan region according to the present disclosure, a target object image center is automatically located, and the target object image center is set to be the same as the screen center of the input region. Thus, there is provided an advantageous effect in that the target object image can be prevented from excessively deviating from a predetermined position on the input region due to rotation and tilting of the target object and in that a three-dimensional scanner stably scans the target object and provides the precise three-dimensional model to the user.

In addition, with a present correlation between a position of the jig and a position of the jig image, a distance of movement of the jig image on the input region can be easily computed on the basis of a distance of movement of the jig. Thus, there is provided an advantageous effect in that the time taken to set the scan region is shortened.

BRIEF DESCRIPTION OF THE DRAWINGS

FIG. 3 is a flowchart illustrating a method of setting a scan region according to one embodiment of the present disclosure.

FIG. 8 is a flowchart illustrating in detail Step of determining a scan region in the method of setting a scan region according to one embodiment of the present disclosure.

DETAILED DESCRIPTION

Figure 1:
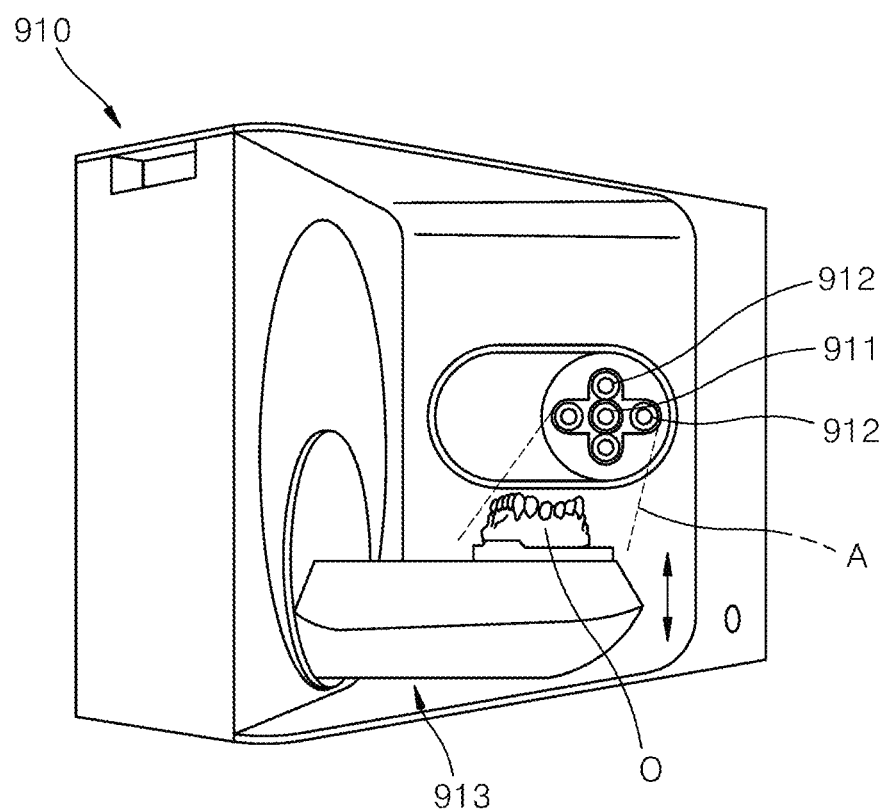
FIG. 1 is a view illustrating a state where a target object is placed on a three-dimensional scanner, the view being referred to for description of the object of the present disclosure.
Figure 2:
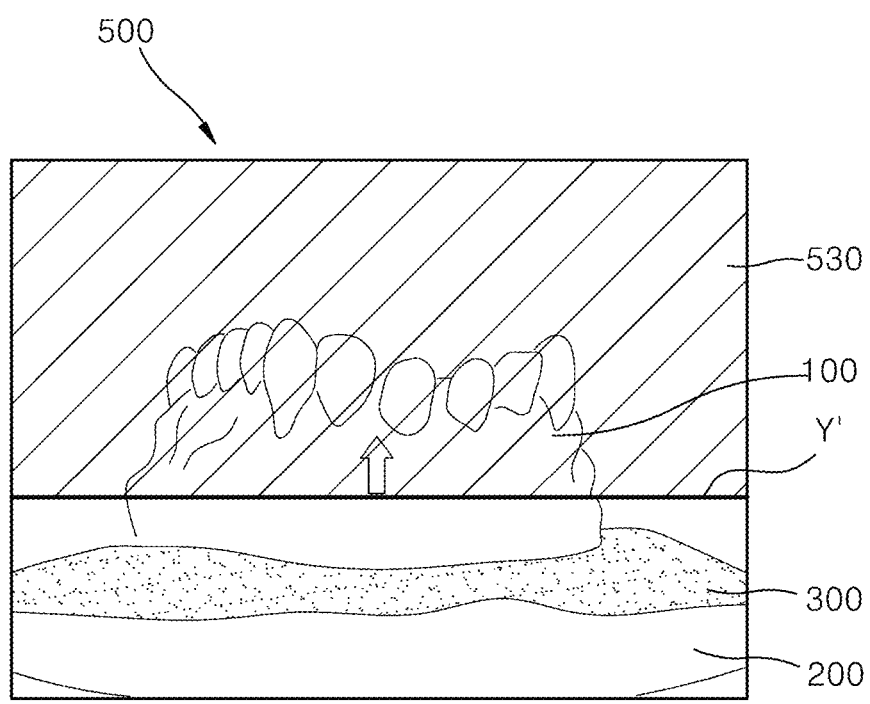
FIG. 2 is a view illustrating a comparative example that is referred to for description of a process in which a user arbitrarily sets a scan region in the related art.

Embodiments of the present disclosure will be described in detail below with reference to the drawings. It should be noted that the same constituent elements, although illustrated in different drawings, are given the same reference character, if possible, throughout the drawings. In addition, specific descriptions of a well-known configuration and function associated with the embodiments of the present disclosure will be omitted when determined as making the embodiments of the present disclosure difficult to understand.

The terms first, second, and so forth, the letters A, B, and so forth, and the letters in parentheses (a), (b), and so forth may be used to describe constituent elements according to each of the embodiments of the present disclosure. These terms and letters are used only to distinguish among the same constituent elements, and do not impose any limitation on the natures of the same constituent elements or the order thereof. In addition, unless otherwise defined, all terms, including technical or scientific terms, which are used in the present specification, have the same meanings as are normally understood by a person of ordinary skill in the art to which the present disclosure pertains. The term as defined in a dictionary in general use should be construed as having the same meaning as interpreted in context in the relevant technology, and, unless otherwise explicitly defined in the present specification, is not construed as having an ideal meaning or an excessively-formal meaning.

A method of setting a scan region according to a first embodiment of the present disclosure will be described in detail below.

FIG. 3 is a flowchart illustrating the method of setting a scan region according to one embodiment of the present disclosure.

With respect to FIG. 3, the method of setting a scan region according to one embodiment of the present disclosure may include Step S110 of placing a target object, Step S130 of determining a scan region, and Step S140 of performing three-dimensional modeling. In addition, as a specific practical example, a method of setting a scan region according to a specific embodiment of the present disclosure may further include Step S120 of aligning the target object.

The method of setting a scan region according to one embodiment of the present disclosure will be described in more detail with reference to the accompanying drawings.

Figures 4A, 4B:
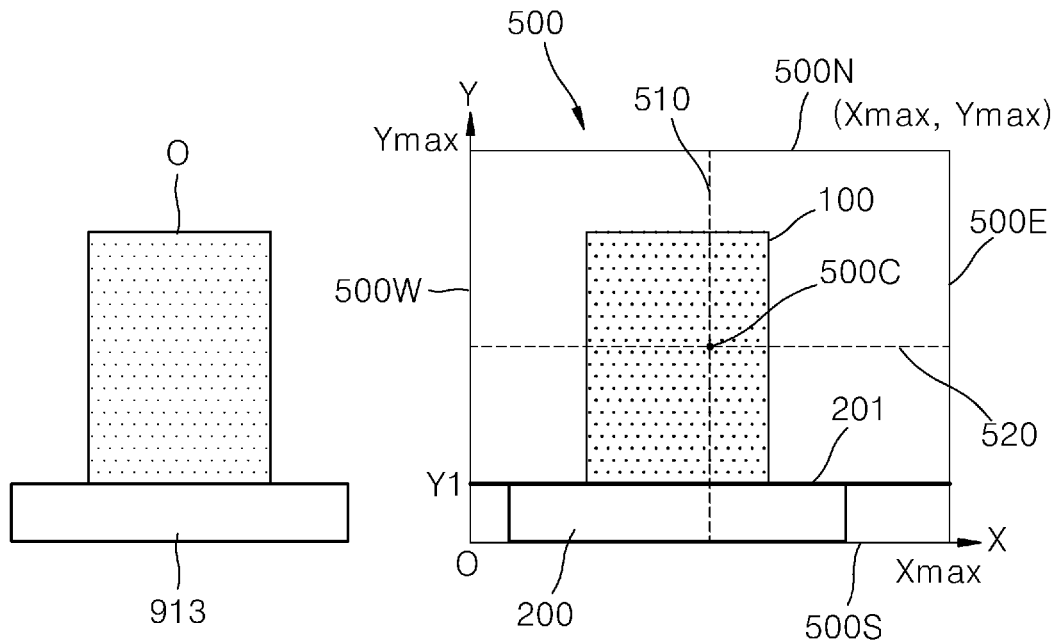
FIGS. 4A and 4B are views that are referred to for description of a step of placing a target object in the method of setting a scan region according to one embodiment of the present disclosure.

FIGS. 4A and 4B are views that are referred to for description of Step S110 of placing a target object in the method of setting a scan region according to one embodiment of the present disclosure. More specifically, FIG. 4A is a view that is referred to for description of a state where a target object O is placed on a jig 913 of a three-dimensional scanner 910 in Step S110 of placing a target object, and FIG. 4B is a view that is referred to for description of a state where a target object image 100 representing a shape of the target object O placed on the jig 913 is plotted on an input region 500.

With reference to FIGS. 1, 3, and 4A, in Step S110 of placing a target object, a user can place the target object O on the upper surface of the jig 913. As an example, an adhesive member, such as Blu-Tack reusable adhesive, may be formed on the upper surface of the jig 913 in a manner that is stacked thereon, and the target object O may be seated on the adhesive member.

The target object O may be an object representing a state of a patient's oral cavity. As an example, the target object O may be a negatively impressed mold acquired by pressing the patient's teeth into a soft substance. As another example, the target object O may be a positively impressed model acquired by pouring plaster of paris into the negatively impressed mold. The target object O may represent the state of the patient's oral cavity, including at least one of a projected or recessed upper surface of a tooth, an arrangement of teeth, and the presence or absence of a missing tooth. A user can analyze the patient's oral cavity using a three-dimensional model of the target object O that is acquired by scanning the target object O, or may design or manufacture an orthodontic treatment object suitable for the patient.

With reference to FIGS. 1 and 4B, when the target object O is placed on the jig 913 in Step S110 of placing a target object, at least one portion of the target object image 100 representing the shape of the target object O may be plotted on the input region 500. Images of objects present within an angle A of view of a camera 912 that constitutes the three-dimensional scanner 910 may be plotted on the input region 500. As an example, as illustrated in FIG. 4B, the target object image 100 representing the target object O and a jig image 200 representing the jig 913 may be plotted on the input region 500. Depending on the situation, a shape of a portion of the jig 913 may be plotted on the input region 500, and a lower portion of the jig 913 may not be plotted on the input region 500. However, plotting of a shape of the entire jig 913 on the input region 500 is not consistent with the object of the present disclosure. The jig image 200 may not represent the entire jig 913 in a state where the target object image 100 representing the target object O is effectively plotted on the input region 500.

The input region 500 may be a region on which images of objects, present within the angle of view of the camera 912, that are displayed on a display device (for example, a display unit 930 described below) are plotted. As an example, the input region 500 may be a region that is defined by an input region upper end 500N, an input region lower end 500S, an input region left end 500W, and an input region right end 500E. A point at which the input region lower end 500S and the input region left end 500W meet with each other may be set as the origin O of the input region 500. A distance from the origin O to a point at which the input region lower end 500S and the input region right end 500E meet with each other may correspond to a transverse length of the input region 500. In addition, a distance from the origin O to a point at which the input region upper end 500N and the input region left end 500W meet with each other may correspond to a longitudinal length of the input region 500. A point at which the input region upper end 500N and the input region right end 500E meet with each other may be a point that has a X-coordinate Xmax representing a maximum value and a Y-coordinate Ymax representing a maximum value on the input region 500. As an example, an X-coordinate and a Y-coordinate of an image may be plotted as a pixel-based distance from the origin O, but are not necessarily limited thereto.

In addition, the input region 500 may have an input-region left-right-side central axis 510, that is, a center line between the input region left end 500W and the input region right end 500E. An X-coordinate of the input-region left-right-side central axis 510 may have a value that is half of the value (0.5*Xmax) of a maximum X-coordinate Xmax. In addition, the input region 500 may have an input-region upper-lower-side central axis 520 that is a center line between the input region upper end 500N and the input region lower end 500S. A Y-coordinate of the input-region upper-lower-side central axis 520 may have a value that is half of the value (0.5*Ymax) of a maximum Y-coordinate Ymax. A point at which the input-region left-right-side central axis 510 and the input-region upper-lower-side central axis 520 intersect may be a screen center 500C representing the center of the input region 500. In a case where the target object image 100 is plotted close to the screen center 500C, a three-dimensional model representing the target object O may be easily acquired.

Step S120 of aligning the target object will be described below.

Figure 5:
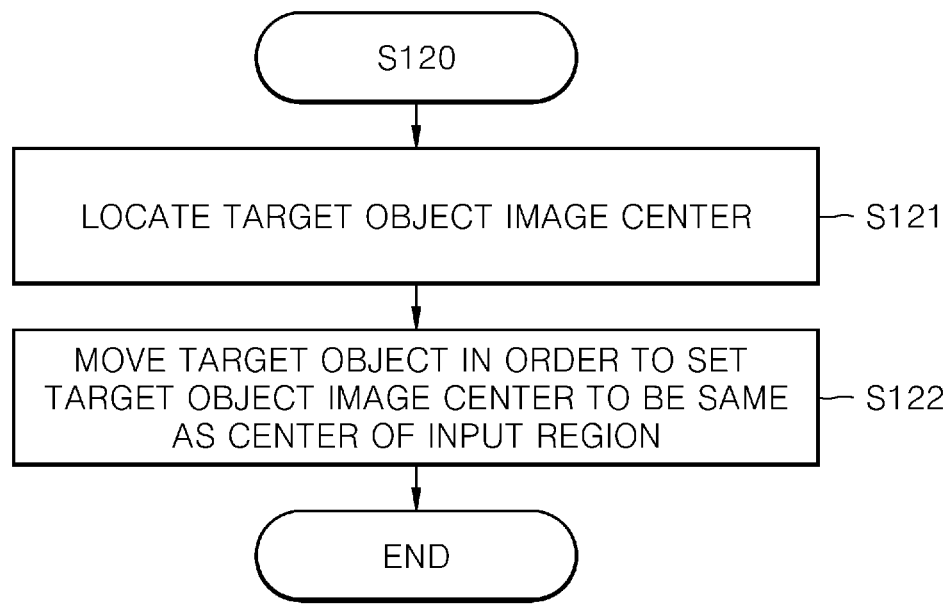
FIG. 5 is a flowchart illustrating in detail Step of aligning the target object in the method of setting a scan region according to one embodiment of the present disclosure.
Figure 6A:
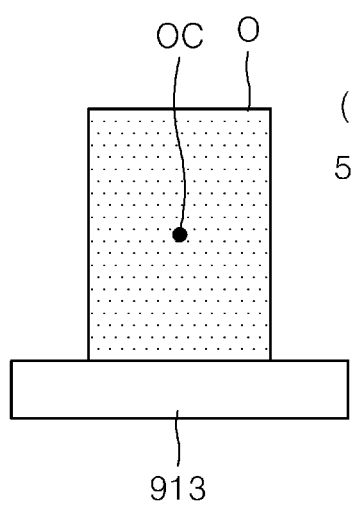
FIGS. 6A and 6B are views that are referred to for description of Step of locating the center of the target object in the method of setting a scan region according to one embodiment of the present disclosure.
Figure 6B:
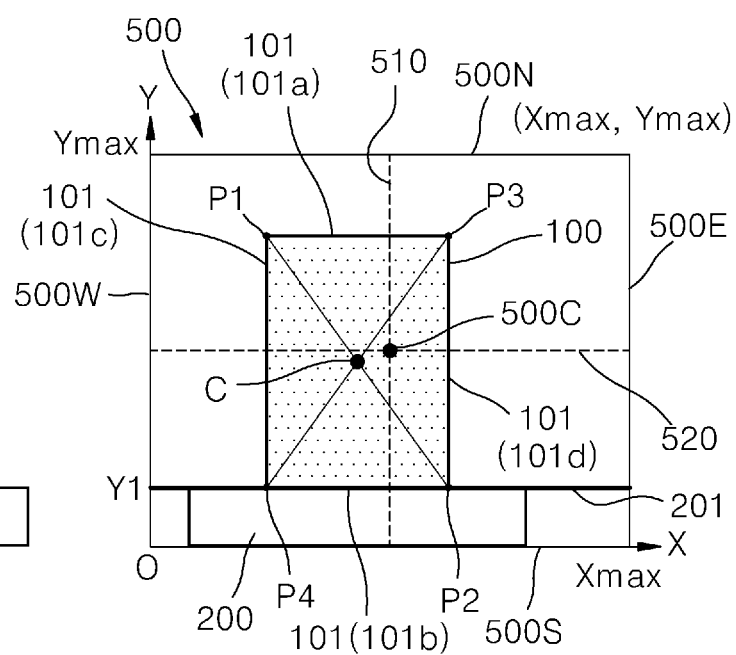

FIG. 5 is a flowchart illustrating in detail Step S120 of aligning the target object in the method of setting a scan region according to one embodiment of the present disclosure. FIGS. 6A and 6B are views that are referred to for description of Step S121 of locating the center of the target object in the method of setting a scan region according to one embodiment of the present disclosure. FIG. 6A is a view that is referred to for description of an actual target-object center OC of the target object O. FIG. 6B is a view that is referred to for description of a process of locating a target-object image center C of the target object image 100 plotted on the input region 500.

With reference to FIGS. 3, 5, 6A, and 6B, the method of setting a scan region according to one embodiment of the present disclosure may include Step S120 of aligning the target object that is performed before Step S130 of determining a scan region. Step S130 will be described below. In Step S120 of aligning the target object, a control unit 920 may align the target object O in such a manner that the target object image 100 is plotted at a predetermined point on the input region 500. The target object O is moved in such a manner that the target object image 100 is allotted at the predetermined point on the input region 500. Thus, the target object image 100 may not deviate from the input region 500 while rotating and/or tilting the target object O. In addition, since the target object image 100 is allotted at the predetermined point on the input region 500, the advantage of minimizing a change in a position of the target object image 100 on the input region 500 while the taget object O is rotated and/or tilted can be achieved.

Step S120 of aligning the target object may include Step S121 of locating the center of the target object. As an example, in Step S121 of locating the center of the target object, a scan region determination unit 925 of the control unit 920 may locate the target-object image center C of the target object image 100 that corresponds to the target object center OC. As illustrated in FIG. 6B, the target-object image center C may be located through the use of a target-object image contour 101. As an example, for the target-object image contour 101, before the target object O is aligned, the jig 913 may precisely move the target object O vertically and/or horizontally under the control of a three-dimensional scanner controller 922 of the control unit 920. Accordingly, through a process of precisely moving the target object image 100 on the input region 500, left-right end contours and upper-lower end contours of the target object image 100 may be located. For example, in Step S121 of locating the center of the target object, the scan region determination unit 925 of the control unit 920 may locate a target object contour 101. The target object contour 101 includes a first contour 101a that is an upper-end contour of the target object image 100, a second contour 101b that is a lower-end contour thereof, a third contour 101c that is a left-end contour thereof, and a fourth contour 101d that is a right-end contour thereof. A lower end of the target object image 100 comes into contact with a jig image upper end 201 of the jig image 200, and therefore, the second contour 101b may be located on the basis of the jig image upper end 201. The target object contour 101 may form a boundary box.

The target-object image center C may be determined as the center of the boundary box. As an example, the scan region determination unit 925 may determine as the target-object image center C a point at which a center line between the first contour 101*a* and the second contour 101*b* of the target object contour 101 and a center line between the third contour 101*c* and the fourth contour 101*d* thereof meet with each other.

As another example, the target-object image center C may be a point at which a line connecting contour points P1 and P2 of the target object contour 101 and a line connecting contour points P3 and P4 thereof intersect. For example, the scan region determination unit 925 may determine the target-object image center C as an intersection point at which a first diagonal line connecting the first contour point P1 and the second contour point P2 and a second diagonal line connecting the third contour point P3 and the fourth contour point P4 go across.

As another example, the scan region determination unit 925 may determine the target-object image center C as a centroid that is the center of a plane figure at which the moment of the target object image 100 is 0. For example, in Step S121 of locating the center of the target object, a point at which the moment of the target object image 100 is 0 within a region detected as the target object image 100 may be determined as the target-object image center C.

With this determination of the target-object image center C in Step S121 of locating the center of the target object, the target object image 100 may be aligned on the input region 500 in such a manner as to be effectively plotted thereon, and the user may stably acquire a precise three-dimensional model representing the target object O.

Figure 7A:
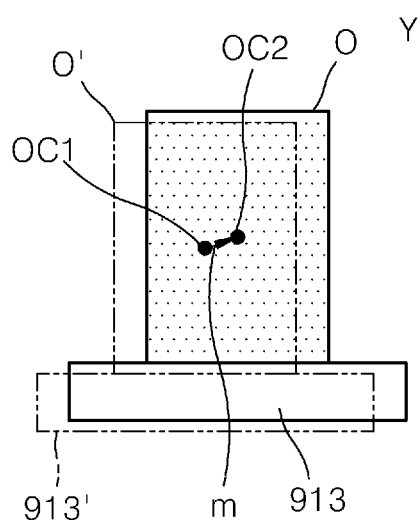
FIGS. 7A and 7B are views that are referred to for description of Step of moving the target object to a home position thereof in the method of setting a scan region according to one embodiment of the present disclosure.
Figure 7B:
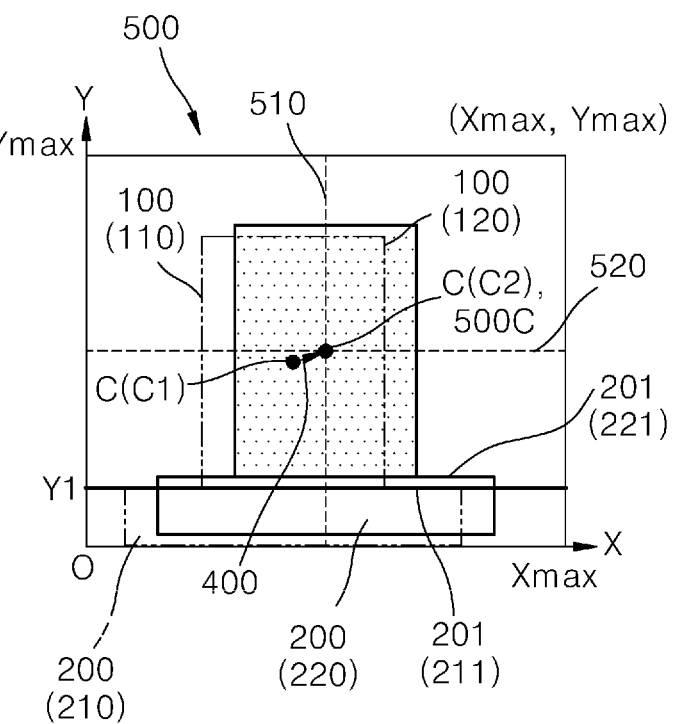

FIG. 7 is a view that is referred to for description of Step S122 of moving the target object to a home position thereof in the method of setting a scan region according to one embodiment of the present disclosure. More specifically, FIG. 7A is a view that is referred to for description of a process in which the jig moves the target object O in Step S122 of moving the target object to a home position thereof. FIG. 7B is a view that is referred to for description of a process of moving the target object image 100 plotted on the input region 500 that corresponds to the object O in Step S122 of moving the target object to a home position thereof.

With reference to FIGS. 5, 7A, and 7B, Step S120 of aligning the target object may include Step S122 of moving the target object to a home position thereof. In Step S122 of moving the target object to a home position thereof, the three-dimensional scanner controller 922 of the control unit 920 may move the target object O in order to set the center of the target object image 100 to be the same as the center of the input region 500. As an example, in Step S122 of moving the target object to a home position thereof, the target-object image center C may be set to be the same as the screen center 500C of the input region 500. At this point, in order to move the target-object image center C toward the screen center 500C, the jig 913 may ascend, descend, or move leftward or rightward to move the target object O.

As illustrated in FIG. 7A, the first jig 913' supporting the first target object O' may move a first target object O', arranged at a first position, away from the first position. Accordingly, the first target object O' may be moved to a second position and may be seated on the jig 913 at a position of a second target object O, and a first target object center OC1 is moved to a second target object center OC2. As illustrated in FIG. 7B, a movement of the target object O is expressed as a phenomenon where a first target object image 110 is moved to a second target object image 120. In addition, the target-object image center C may be moved from a first target-object center C1 to a second target-object image center C2, and the target-object image center C that is moved to the second target-object image center C2 may be the same as the screen center 500C.

Since the three-dimensional scanner controller 922 moves the jig image 913, the jig image 200 may also be moved on the input region 500. As an example, the jig image 200 may be moved from a first jig image 210 that is at the first position on the input region 500 toward a second jig image 220 that is at the second position on the input region 500, and a jig image upper end 210 may also be moved from a first jig image upper end 211 that is at the first position on the input region 500 toward a second jig image upper end 221 that is at the second position on the input region 500.

In this manner, in Step S122 of moving the target object to a home position thereof, the target-object image center C is aligned in such a manner as to be the same as the screen center 500C. Thus, the target object image 100 is prevented from deviating from the input region 500, and the target object image 100 is prevented from being excessively moved within the input region 500. Therefore, the user can stably acquire the three-dimensional model representing the target object O.

Step S130 of determining a scan region will be described below.

Figure 9:
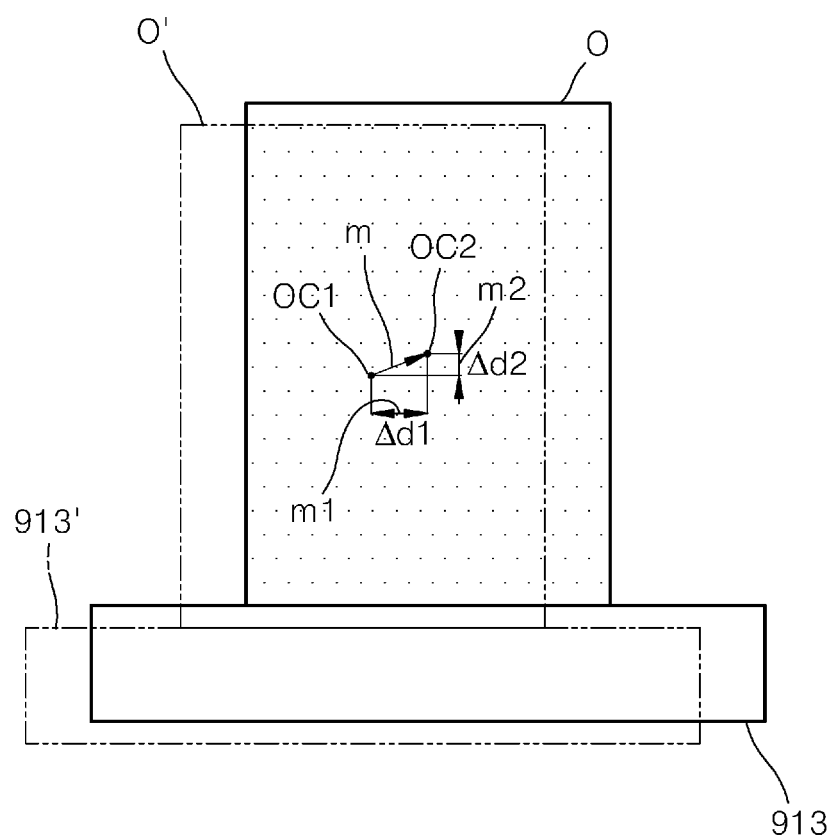
FIG. 9 is a view that is referred to for description of a distance of movement of a jig in the method of setting a scan region according to one embodiment of the present disclosure.
Figure 10:
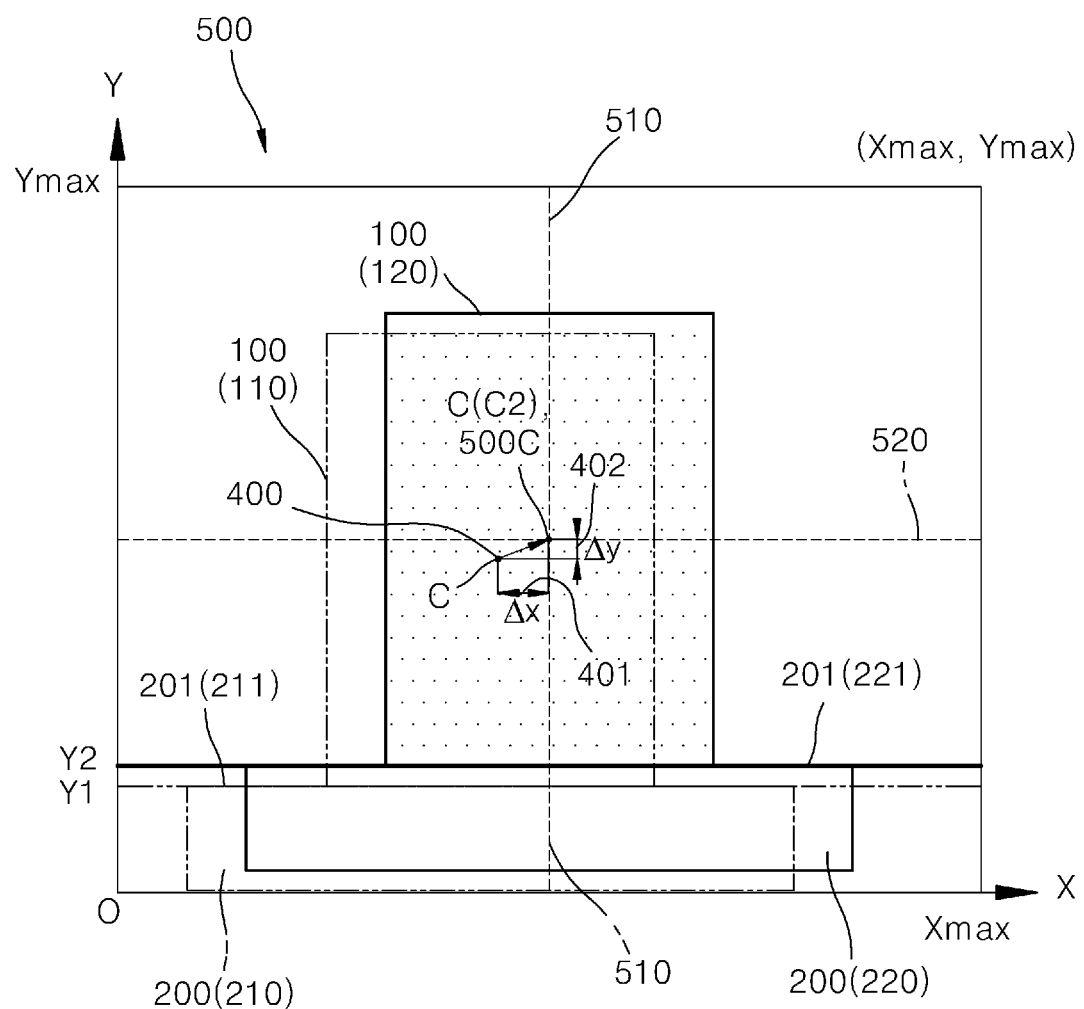
FIG. 10 is a view that is referred to for description of a process of computing a distance of movement of a jig image on an input region on the basis of the distance of movement of the jig.

FIG. 8 is a flowchart illustrating in detail Step S130 of determining a scan region in the method of setting a scan region according to one embodiment of the present disclosure. FIG. 9 is a view that is referred to for description of a distance m of movement of the jig 913 in the method of setting a scan region according to one embodiment of the present disclosure. FIG. 10 is a view that is referred to for description of a process of computing a distance 400 of movement of the jig image 200 on the input region 500 on the basis of the distance m of movement of the jig 913.

With reference to FIGS. 3, 8, 9, and 10, the method of setting a scan region according to one embodiment of the present disclosure may include the Step S130 of determining a scan region. As an example, in the Step S130 of determining a scan region, the scan region determination unit 925 of the control unit 920 may determine as the scan region 530 a predetermined upper portion of the input region 500 from the jig image 200 representing a shape of the jig 913. The scan region 530 has to be set in such a manner as not to include images of objects other than the target object image 100, and therefore, an image of the jig 913 supporting the target object O has to be excluded from the scan region 530. Therefore, in order to determine the scan region 530, coordinates of the jig image 200 have to be acquired, and the scan region 530 may be set on the basis of the coordinates of the jig image 200.

For detailed description, the Step S130 of determining a scan region is divided into sub-steps. The Step S130 of determining a scan region may include Step S131 of acquiring a distance of movement of a jig, Step S132 of acquiring coordinates of a jig image, and Step S133 of designating the scan region.

In Step S131 of acquiring a distance of movement of a jig, the scan region determination unit 925 of the control unit 920 may acquire the distance m that the jig 913 is moved in Step S120 of aligning the target object. As illustrated in FIG. 9, the first jig 913' supporting the first target object O' may move the first target object O', arranged at the first position, away from the first position. Thus, the first target object O' may be moved to the second position and may be seated on the jig 913 at the position of the second target object O. The first target object center OC1 is moved to the second target object center OC2. At this point, the first target object center OC1 may be moved the predetermined distance m to the second target object center OC2, and the jig 913 on which the target object O is seated may also be moved the predetermined distance m. The distance m of movement may be a vector sum of a distance m1 of horizontal movement that corresponds to a length of Δd1 and a distance m2 of vertical movement that corresponds to a length of Δd2. The distance m of movement may be acquired in the standard unit of length (for example, the known unit for length measurement, such as cm, mm, μm, or inch).

In addition, in Step S132 of acquiring coordinates of a jig image, the control unit 920 may compute the distance 400 that the jig image 200 is moved on the input region 500 in a manner that corresponds to the distance m of movement. As illustrated in FIG. 10, the target object image 100 within the input region 500 that corresponds to the target object O may be moved from the first target object image 110 to the second target object image 120 in a manner that corresponds to the movement of the target object O, and the jig image 200 within the input region 500 that corresponds to the jig 913 may be moved from the first jig image 210 to the second jig image 220 in a manner that corresponds to the movement of the jig 913. The distance 400 of movement of the jig image 200 on the input region 500 may be acquired in such a manner as to correspond to the distance m of movement of the jig 913. As an example, the distance 400 of movement on the input region 500 may be a vector sum of a distance 401 of horizontal movement on the input region 500 that corresponds to a length of Δx and a distance 402 of vertical movement on the input region 500 that corresponds to a length of Δy. The distance 400 of movement on the input region 500 may be acquired as a pixel-based distance, but is not necessarily limited thereto.

When the distance 400 of movement on the input region 500 is computed, the coordinates of the jig image 200 may be acquired. As an example, the coordinates of the jig image 200 are acquired by adding the distance 400 of movement of the jig 913 of the three-dimensional scanner 910 on the input region 500, which is computed in Step S132 of acquiring coordinates of a jig image, to the initial coordinates of the jig 913 that correspond to an initial position of the jig 913 that is preset in Step S110 of placing a target object. That is, the coordinates of the jig image 200 may be acquired by adding a length of Δx that corresponds to the distance 401 of horizontal movement on the input region 500 to an X-axis coordinate of the initial coordinates of the jig 913 and by adding a length of Δy that corresponds to the distance 402 of vertical movement on the input region 500 to a Y-axis coordinate of the initial coordinates thereof. Particularly, the jig image upper end 201 may be moved from the first jig image upper end 211 at the first position to the second jig image upper end 221 at the second position. Coordinates of the jig image upper end 201 may also be acquired by adding a length of Δx that corresponds to the distance 401 of horizontal movement on the input region 500 to an X-axis coordinate of initial coordinates of an upper end of the jig 913 and by adding a length of Δy that corresponds to the distance 402 of vertical movement on the input region 500 to a Y-axis (Y1) coordinate of the initial coordinates of the upper end of the jig 913.

Figure 11:
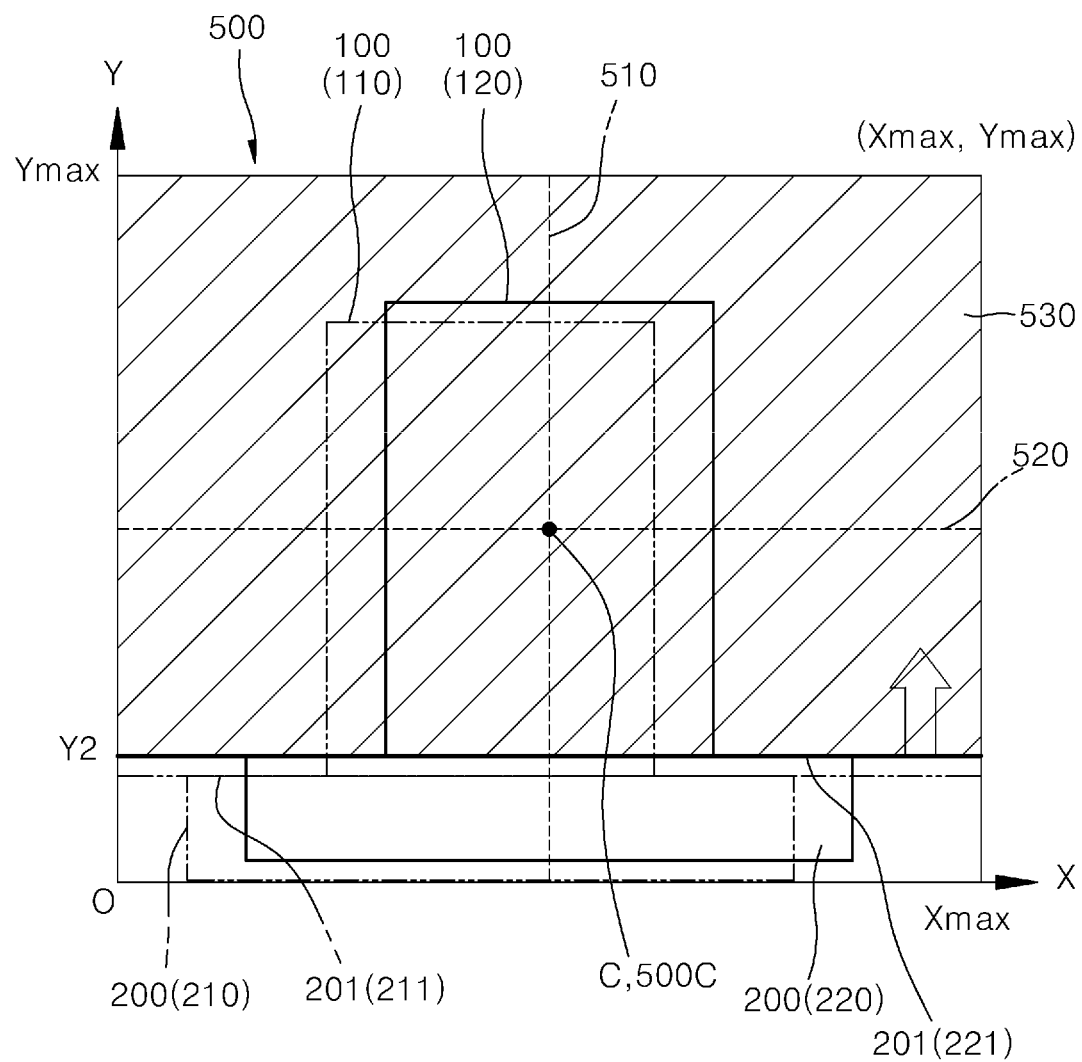
FIG. 11 is a view that is referred to for description of a process of designating the scan region in a method of setting a scan region according to a first embodiment of the present disclosure.

FIG. 11 is a view that is referred to for description of a process of designating the scan region 530 in a method of setting a scan region according to a first embodiment of the present disclosure.

With reference to FIG. 11, in Step S130 of determining a scan region in the method of setting a scan region according to the first embodiment of the present disclosure, the scan region determination unit 925 of the control unit 920 may determine the scan region 530 on the basis of the distance m that the jig 913 is moved in Step S120 of aligning the target object. More specifically, in Step S133 of designating the scan region, the scan region 530 may be designated from coordinates of the target object image 100 or the coordinates of the jig image 200 on the input region 500. As an example, a horizontal length of the scan region 530 may be the same as a horizontal length of the input region 500. That is, the horizontal length of the scan region 530 may be a horizontal length Xmax of the input region 500 from the input region left end 500W to the input region right end 500E. In addition, a vertical length of the scan region 530 may be a vertical distance from an upper end of the input region 500 to an upper end of the jig image 200. That is, the vertical length of the scan region 530 is a vertical distance from the input region upper side 500N to the jig image upper end 201. In this case, a Y-axis coordinate Y2 of the second jig image upper end 221 may be acquired by adding a length of Δy that corresponds to a distance of vertical movement on the input region 500 to the Y-axis coordinate Y1 of the initial coordinates of the jig 913. In other words, the scan region 530 may cover all portions of the input region 500 that have a Y-axis coordinate which has the same or higher value compared with the Y-axis coordinate Y2 of the second jig image upper end 221. In this manner, the scan region 530 is set in such a manner that the jig image 200 is excluded. Accordingly, images of objects other than the target object image 100 may be sorted out as noise and may be excluded from a three-dimensional modeling target. Thus, there can be provided an advantage in that the user can acquire the precise three-dimensional model that has only a shape of the target object.

Whenever necessary, the adhesive member for securely fixing the target object O to the jig 913 may also be excluded from the scan region 530. In this case, the vertical length of the scan region 530 may be a vertical distance from the input region upper end 500N to a point at a predetermined height from the jig image upper end 201. In other words, the scan region 530 may cover all portions of the input region 500 that have a Y-axis coordinate which has a value equal to or higher than a predetermined separation height of δ from the Y-axis coordinate Y2 of the second jig image upper end 221. As an example, the separation height of δ may be a height (for example, 100 pixels) of an adhesive-member image that corresponds to a height (for example, 10 mm) of the adhesive member.

In addition, as an example, the separation height of δ may have a preset value. Thus, the preset value may be automatically applied. As another example, the adhesive member for fixing the target object O to an upper end of the jig 913 may vary in thickness whenever the adhesive member is applied to the upper end of the jig 913. Therefore, the separation height of δ may be selectively set in response to user input. Accordingly, the jig image 200 and the adhesive-member image may be excluded from the scan region 530.

In this manner, the scan region 530 is set in such a manner that the jig image 200 and the adhesive-member image are excluded. Accordingly, the images of objects other than the target object image 100 may be sorted out as noise and may be excluded from a three-dimensional modeling target. Thus, there can be provided an advantage in that the user can acquire the precise three-dimensional model that has only the shape of the target object.

Figure 12:
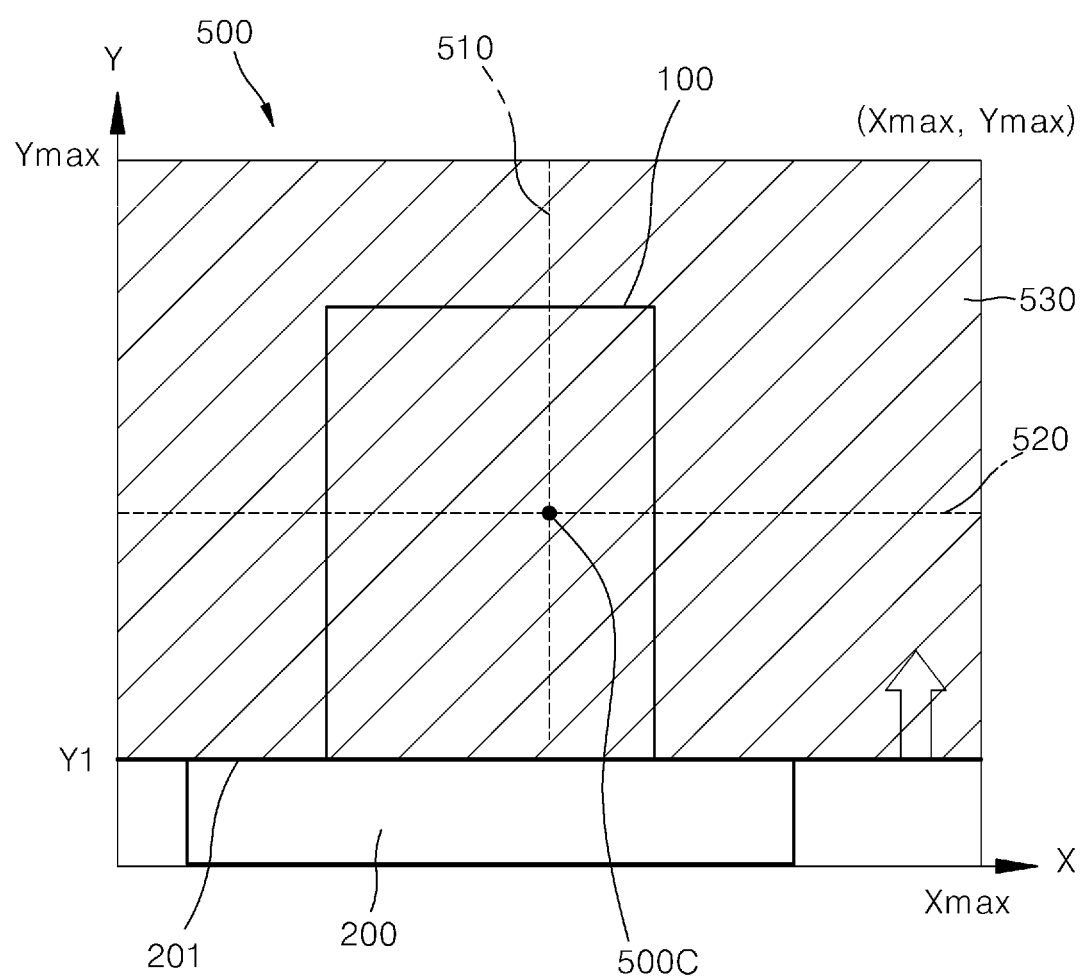
FIG. 12 is a view that is referred to for description of a process of designating the scan region in a method of setting a scan region according to a second embodiment of the present disclosure.

FIG. 12 is a view that is referred to for description of a process of designating the scan region 530 in a method of setting a scan region according to a second embodiment of the present disclosure.

With reference to FIG. 12, the scan region 530 determined in Step S130 of determining a scan region in the method of setting a scan region according to the second embodiment of the present disclosure may be set regardless of Step S120 of aligning the target object. As an example, the coordinates of the jig image 200 may be determined according to a preset correlation between a position of the jig 913 and a position of the jig image 200. The preset correlation may be prestored in the database unit 921 of the control unit 920. In this case, the initial position of the jig 913 may have initial coordinates of the jig 913 that vary with the preset correlation. For example, when an initial position of the jig 913 is 0 mm, a Y-axis coordinate Y1 of the jig image upper end 201 may have a value of 50 pixels. In this case, the scan region 530 may cover all portions of the input region 500 that have a Y-axis coordinate which has the same or higher value compared with the Y-axis coordinate Y1 of the jig image upper end 201. In a case where this preset correlation between the position of the jig 913 and the position of the jig image 200 is available, the position of the jig image 200 may be quickly acquired, and the scan region 530 may be rapidly determined. Thus, the advantage of improving a speed of acquirement of the three-dimensional model representing the target object O can be achieved.

In a case where the target object O is tilted, the scan region 530 may be adjusted in such a manner as to correspond to a tilting angle of the target object O. As an example, in a case where a lower surface of the target object O is tilted in such a manner as to face the camera 912 of the three-dimensional scanner 910, a value of the Y-axis coordinate Y1 or Y2 of the jig image upper end 201 may be increased, and the scan region 530 may be decreased in size in a manner that corresponds to the tilting angle. As another example, in a case where an upper surface of the target object O is tilted in such a manner as to face the camera 912, a value of the Y-axis coordinate Y1 or Y2 of the jig image upper end 201 may be increased, and the scan region 530 may be decreased in size in a manner that corresponds to the tilting angle.

In addition, although not illustrated, the three-dimensional scanner 910 may scan the target object O, and thus the control unit 920 may identify the target object image 100. As an example, when the target object O is scanned, it may be identified that the target object image 100 representing the target object O is an image of a model cast from plaster of paris. An artificial intelligence technique of performing color or shape learning may be used as a technique of identifying the target object O, but the present disclosure is not necessarily limited to the artificial intelligence technique. As another example, in a case where a color of the jig 913 or the adhesive member is set as a target for deletion, among images plotted on the input region 500, the jig image 200 and an adhesive-member image 300 may be excluded from three-dimensional modeling computation, and only the target object image 100 may be three-dimensionally modeled by a three-dimensional modeling unit 924.

As a technique of setting a deletion-target color, a technique in which the user directly selects the deletion-target color and a technique in which a deletion-target object (for example, the adhesive member) is scanned before scanning the target object O, in which a color of the deletion-target object is analyzed, and in which the deletion-target color is automatically designated may be used.

When the scan region 530 is determined through a sequence of steps as described above, the target object image (at least one two-dimensional or three-dimensional image data piece or at least one two-dimensional image data piece and at least one three-dimensional image data piece) representing the target object O may be acquired. In addition, in the Step S140 of performing three-dimensional modeling, an alignment unit 923 and the three-dimensional modeling unit 924 of the control unit 920 may generate a three-dimensional model of the target object O on the basis of the target object image 100 resulting from scanning the scan region 530. In order to generate the three-dimensional model of the target object O, the three-dimensional scanner may acquire the target object image 100, and the control unit connected to the three-dimensional scanner may align and merge the above-described target object images and thus may generate the three-dimensional model representing the target object.

A scan region setting system for performing the method of setting a scan region according to one embodiment of the present disclosure will be described below. A portion of a description of the scan region setting system that is the same as that of the description of the method for setting a scan region may be repeated briefly or omitted.

Figure 13:
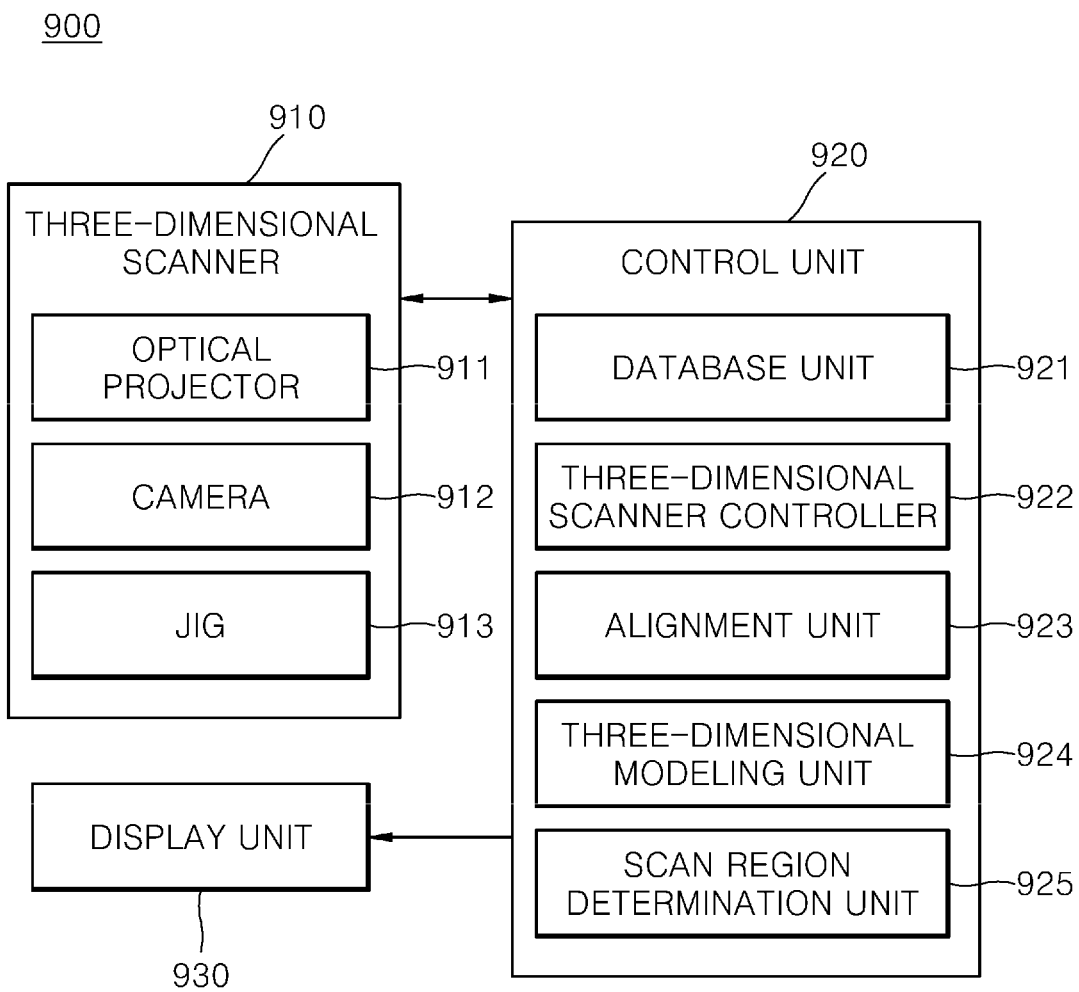
FIG. 13 is a block diagram schematically illustrating a scan region setting system for performing the method of setting a scan region according to one embodiment of the present disclosure.

FIG. 13 is a block diagram schematically illustrating a scan region setting system 900 for performing the method of setting a scan region according to one embodiment of the present disclosure.

With reference to FIGS. 1 and 13, the scan region setting system 900 for performing the method of setting a scan region according to one embodiment of the present disclosure may include the three-dimensional scanner 910, the control unit 920, and the display unit 930.

Examples of the three-dimensional scanner 910 may include a table-type scanner that places a target object at a predetermined position, rotates and/or tilts the target object, and acquires a three-dimensional model representing the target object. The three-dimensional scanner 910 may be installed at a predetermined place. There occurs a small change in a distance between the camera 912 of the three-dimensional scanner 910 and the target object. Accordingly, target object images acquired at uniform distances may be easily merged, and thus, the three-dimensional model may be generated.

The control unit 920 may be configured to possibly perform data computation. As an example, the control unit 920 may be a computation device including a microprocessor. The control unit 920 may be at least one of general-purpose computation devices including a desktop PC, a tablet PC, and a local server. In addition, the control unit 920 may be a cloud control unit.

The control unit 920 may be connected to the three-dimensional scanner 910 in a wired or wireless way in such a manner as to possibly perform data communication therewith. The control unit 920 may receive from the three-dimensional scanner 910 the target object images resulting from the scanning, may merge the received target object images and thus may generate the three-dimensional model. In addition, the control unit 920 may control the three-dimensional scanner 910 in such a manner that an optical projector 911 of the three-dimensional scanner 910 projects a pattern or that the camera 912 at a specific position operates. In addition, the control unit 920 may control rotating and tilting of the jig 913 on which the target object O is placed in order to acquire a plurality of target object images representing various portions of the target object O. As an example, the control unit 920 may control the three-dimensional scanner 910 and thus may adjust a direction and an angle of the target object O with respect to at least one camera 912.

A configuration of each constituent element of the scan region setting system 900 will be described in detail below.

The three-dimensional scanner 910 may project a predetermined pattern onto the target object O and may acquire the target object images representing the target object O. As an example, the three-dimensional scanner 910 may include the optical projector 911 that projects a pattern onto a surface of the target object.

The optical projector 911 may include a light source that emits light and a pattern generation unit that forms a predetermined pattern when the light passing through the pattern generation unit is emitted to the surface of the target object O. The pattern generation unit may be at least one of pattern generation elements that include a pattern mask and a DMD. Through the light source and the pattern generation unit, the optical projector 911 may project at least two patterns onto the surface of the target object O.

However, in order to project at least two patterns onto the surface of the target surface O, the optical projector 911 may generate a single pattern or a plurality of patterns. That is, although a single pattern is generated, the optical projector 911 may rotate the single pattern in one direction. In a fixed state, the optical projector 911 may generate at least two patterns through transformation by the pattern generation unit.

In addition, the three-dimensional scanner 910 may include at least one camera 912. The camera 912 receives light through a lens, and the light may be generated into a target object image through a built-in image sensor. The image sensor may be a CCD sensor or at least one of existing image sensing devices that include a CMOS sensor. More specifically, the camera 912 may be arranged on one side of the optical projector 911, and the camera 912 may scan the target object O onto which a predetermined pattern is projected by the optical projector 911 and may acquire a plurality of target object images.

In addition, the three-dimensional scanner 910 may include the jig 913 for placing the target object O. As an example, the jig 913 may place the target object O on a flat tray, and the jig 913 may move the target object O in a straight line and/or may rotate the target object O. As an example, the jig 913 may move the target object O in a straight line in at least one of an upward-downward direction, a leftward-rightward direction, and a forward-backward direction. As another example, the jig 913 may rotate the target object O, in one direction, about the Z-axis direction. As still another example, the jig 913 may tilt the target object O in one direction. In this manner, the jig 913 on which the target object O is placed may move the target object O in a straight line, may rotate the target object O, and/or may tilt the target object O. Therefore, the object O can be scanned from various angles with respect to the camera 912, and the three-dimensional model at a high completion level can be acquired. In addition, the jig 913 moves the target object O, and the target object image is aligned to a predetermined point on the input region 500 of the display unit 930. Thus, the advantage of acquiring the target object image stably and acquiring the three-dimensional model precisely representing the target object can be achieved.

A detailed configuration of the control unit 920 will be described below.

The control unit 920 may include the database unit 921. The database unit 921 may be at least one of general-purpose storage devices that include a hard disk drive, a solid state drive, and a flash drive. A plurality of target object images 100 acquired while the three-dimensional scanner 910 performs scanning may be stored in the database unit 921. Stored in the database unit 921 may be various logics that include a logic for aligning the target object image 100, a logic for computing a distance of movement of the jig image 200 on the input region 500 from the distance of movement of the jig 913, a logic for determining the scan region 530, a three-dimensional modeling logic, and a logic for controlling the three-dimensional scanner 910.

The control unit 920 may include the three-dimensional scanner controller 922. The three-dimensional scanner controller 922 may control the jig 913 in order to arrange the target object image at a predetermined point on the input region 500. More specifically, the three-dimensional scanner controller 922 may control the jig 913 in such a manner that the target-object image center C corresponding to the target object O is set to be the same as the screen center 500C of the input region 500. In addition, the three-dimensional scanner controller 922 may control the pattern projected by the optical projector 911 onto the target object O when acquiring the target object image. In addition, the three-dimensional scanner controller 922 may activate at least one camera 912 in such a manner as to operate when the target object image is acquired.

The control unit 920 may include the alignment unit 923. The alignment unit 923 may align the plurality of target object images. A known data alignment technique may be used in order to align the plurality of target object images. As an example, the alignment unit 923 may align the plurality of target object images using an iterative closest point (ICP) technique, but is not necessarily limited to this technique.

The control unit 920 may include the three-dimensional modeling unit 924. The three-dimensional modeling unit 924 may merge the aligned target object images and thus may generate the three-dimensional model.

The control unit 920 may include the scan region determination unit 925. The scan region determination unit 925 may determine the scan region 530 on the basis of the target object image 100 and the jig image 200 that are acquired by the three-dimensional scanner 910 and on the basis of coordinates of the jig image 200 (more particularly, the Y-axis coordinate of the jig image upper end 221) that result when the target-object image center C are aligned, by the three-dimensional scanner controller 922, with the screen center 500C. As an example, the three-dimensional scanner controller 922 may acquire the distance m of movement of the jig 913. Moreover, the scan region determination unit 925 may acquire the coordinates of the jig image 200 according to the logic for computing the distance of movement of the jig image 200 on the input region 500 from the distance of movement of the jig 913 and according to a logic for a preset correlation between a position of the jig 913 and a position of the jig image 200. These logics are stored in the database unit 921. The scan region determination unit 925 may determine an upper portion of the jig image 200 as the scan region 530. The jig image 200 and/or the adhesive-member image 300 are excluded from the scan region. Thus, the advantage of possibly acquiring the precise three-dimensional model representing the target object O according to the target object image 100 resulting from precise scanning can be achieved.

At least one portion of a control process by the control unit 920 may be visually displayed on the display unit 930. As n example, the display unit 930 may be at least one of general-purpose visual display devices that include a monitor, a tablet screen, a touch screen, and a projection screen. The plurality of target object images 100 acquired through the three-dimensional scanner 910, the scan region 530, and the three-dimensional model of the target object O that is generated from the plurality of target object images 100 may be visually displayed on the display unit 930. Accordingly, the user can easily identify whether or not the three-dimensional model is precisely acquired, can design an orthodontic treatment object to be used in the patient's oral cavity using the above-described three-dimensional model, and thus can provide optimal dental treatment to the patient.

However, the technical idea of the present disclosure is described above only in an exemplary manner. It is apparent to a person of ordinary skill in the art to which the present disclosure pertains that various alterations and modifications are possibly made to the embodiments of the present disclosure without departing from the nature and gist of the present disclosure.

Therefore, the embodiments disclosed in the present specification are for describing, rather than limiting, the technical idea of the present disclosure and do not impose any limitation on the scope of the technical idea of the present disclosure. Accordingly, the scope of protection of the present disclosure should be defined by the following claims. All technical ideas that fall within the scope equivalent thereto should be interpreted to be included within the scope of the claims of the present disclosure.

DESCRIPTION OF REFERENCE NUMERALS

S110: step of placing a target object
S120: step of aligning the target object
S130: step of determining a scan region
S140: step of performing three-dimensional modeling
100: target object image
200: jig image
500: input region
900: scan region setting system 910: three-dimensional scanner
920: control unit 930: display unit

What is claimed is:

1. A method of setting a scan region, the method comprising:
    placing a target object on an upper surface of a jig of a three-dimensional scanner in such a manner that at least one portion of a target object image representing a shape of the target object is plotted on an input region;
    determining, by a control unit, a predetermined upper portion of the input region, as a scan region, from a jig image representing the shape of the jig; and
    generating, by the control unit, a three-dimensional model of the target object on the basis of the target object image resulting from scanning the scan region,
    wherein a horizontal length of the scan region is a horizontal length of the input region, and a vertical length of the scan region is any one of a vertical distance from an upper end of the input region to an upper end of the jig image and a vertical distance from the upper end of the input region to a point at a predetermined height from the upper end of the jig image.

2. The method of claim 1, further comprising:
    before the determining by the control unit of the predetermined upper portion of the input region as the scan region,
    aligning, by the control unit, the target object in such a manner that the target object image is plotted at a predetermined point on the input region,
    wherein in the determining by the control unit of the predetermined upper portion of the input region as the scan region, the scan region is determined on the basis of a distance that the jig is moved in the aligning by the control unit of the target object.

3. The method of claim 2, wherein the determining by the control unit of the predetermined upper portion of the input region as the scan region comprises:
    acquiring the distance that the jig is moved in the aligning by the control unit of the target object;
    acquiring coordinates of the jig image by computing a distance that the jig image is moved on the input region in a manner that corresponds to the distance of movement of the jig; and
    designating the scan region from the coordinates of the jig image.

4. The method of claim 3, wherein the coordinates of the jig image are acquired by adding the distance of movement on the input region, which is computed in the acquiring of the coordinates of the jig image, to initial coordinates of the jig that correspond to an initial position of the jig that is preset in the placing of the target object.

5. The method of claim 2, wherein the aligning by the control unit of the target object comprises:
    locating a target object image center; and
    moving the target object in order to set the target object image center to be the same as the center of the input region.

6. The method of claim 1, wherein the coordinates of the jig image are determined according to a preset correlation between a position of the jig and a position of the jig image.

* * * * *